(12) United States Patent
Barua et al.

(10) Patent No.: US 10,781,721 B2
(45) Date of Patent: Sep. 22, 2020

(54) INTEGRAL TURBINE CENTER FRAME

(71) Applicant: General Electric Company, Schenectady, NY (US)

(72) Inventors: Ananda Barua, Schenectady, NY (US); Joshua Tyler Mook, Loveland, OH (US); Raymond Floyd Martell, Wyoming, OH (US); Changjie Sun, Clifton Park, NY (US); Gautam Naik, Schenectady, NY (US); Jordan Paule Tesorero, Lynn, MA (US); Aigbedion Akwara, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 100 days.

(21) Appl. No.: 15/892,735

(22) Filed: Feb. 9, 2018

(65) Prior Publication Data
US 2019/0249570 A1 Aug. 15, 2019

(51) Int. Cl.
*F01D 25/28* (2006.01)
*F01D 9/04* (2006.01)
(Continued)

(52) U.S. Cl.
CPC .............. *F01D 25/28* (2013.01); *B22F 5/009* (2013.01); *B29C 64/00* (2017.08); *B33Y 80/00* (2014.12);
(Continued)

(58) Field of Classification Search
CPC ........ F01D 25/28; F01D 25/162; F01D 9/065; F01D 9/041; B33Y 80/00; F05D 2220/31; F05D 2220/32; F05D 2240/14; F02C 7/20
See application file for complete search history.

(56) References Cited

U.S. PATENT DOCUMENTS 2,650,753 A * 9/1953 Howard ................... F02C 3/06
                                                          415/137
4,793,770 A * 12/1988 Schonewald ............. F01D 9/04
                                                          415/142
(Continued)

FOREIGN PATENT DOCUMENTS

EP           2719870 B1 * 12/2016 ........... F01D 25/162

OTHER PUBLICATIONS

Selvaraj et al., Aircraft Structure Manufacturing Using 3D Printing to Reduce Material Loss, Department of Mechanical Engineering University of Bridgeport, CT, Mar. 24, 2017, 1 Page.
(Continued)

*Primary Examiner* — Michael Lebentritt
*Assistant Examiner* — Topaz L. Elliott
(74) *Attorney, Agent, or Firm* — Dority & Manning, P.A.

(57) ABSTRACT

Turbine center frames are provided. For example, a turbine center frame comprises an annular outer case and an annular hub. The hub is defined radially inward of the outer case such that the outer case circumferentially surrounds the hub. The turbine center frame further comprises an annular fairing extending between the outer case and the hub, a ligament extending from the fairing to the outer case to connect the fairing to the outer case, a plurality of struts extending from the hub to the outer case, and a boss structure defined on an outer surface of the outer case. The outer case, hub, fairing, ligament, plurality of struts, and boss structure are integrally formed as a single monolithic component. For instance, the turbine center frame is additively manufactured as an integral structure, and methods for manufacturing turbine center frames also are provided.

19 Claims, 11 Drawing Sheets

(51) Int. Cl.
*B33Y 80/00* (2015.01)
*F01D 9/06* (2006.01)
*F01D 25/16* (2006.01)
*B29C 64/00* (2017.01)
*B22F 5/00* (2006.01)
*B33Y 10/00* (2015.01)
*B22F 3/105* (2006.01)

(52) U.S. Cl.
CPC ............ *F01D 9/041* (2013.01); *F01D 9/065* (2013.01); *F01D 25/162* (2013.01); *B22F 3/1055* (2013.01); *B33Y 10/00* (2014.12); *F05D 2220/32* (2013.01); *F05D 2230/31* (2013.01); *F05D 2240/14* (2013.01)

(56) References Cited

U.S. PATENT DOCUMENTS

| | | | | |
|---|---|---|---|---|
| 5,483,792 | A * | 1/1996 | Czachor | F01D 25/162 |
| | | | | 60/796 |
| 7,594,405 | B2 | 9/2009 | Somanath et al. | |
| 8,347,500 | B2 | 1/2013 | Durocher et al. | |
| 8,371,812 | B2 * | 2/2013 | Manteiga | F01D 9/02 |
| | | | | 415/115 |
| 8,579,583 | B2 | 11/2013 | Bock | |
| 8,770,924 | B2 * | 7/2014 | Beeck | F01D 25/28 |
| | | | | 415/142 |
| 9,316,108 | B2 * | 4/2016 | Pegan, Jr. | F01D 25/162 |
| 9,447,694 | B2 * | 9/2016 | Sanchez | F02C 7/12 |
| 9,631,517 | B2 * | 4/2017 | Liles | F01D 25/162 |
| 9,759,231 | B2 | 9/2017 | Kirchner et al. | |
| 9,847,629 | B2 * | 12/2017 | Moisei | F01D 17/02 |
| 9,938,858 | B2 * | 4/2018 | Klingels | F01D 25/26 |
| 10,087,766 | B2 * | 10/2018 | Pope | F01D 9/02 |
| 10,240,532 | B2 * | 3/2019 | Scott | F01D 9/065 |
| 10,428,692 | B2 * | 10/2019 | Parry | F01D 25/243 |
| 2006/0093465 | A1 | 5/2006 | Moniz et al. | |
| 2008/0022692 | A1 | 1/2008 | Nagendra et al. | |
| 2010/0135770 | A1 | 6/2010 | Durocher et al. | |
| 2014/0186167 | A1 * | 7/2014 | Liles | F01D 25/162 |
| | | | | 415/182.1 |
| 2015/0052872 | A1 * | 2/2015 | Zurmehly | F01D 25/125 |
| | | | | 60/39.08 |
| 2015/0337687 | A1 * | 11/2015 | Scott | F02C 7/20 |
| | | | | 415/215.1 |
| 2015/0345400 | A1 * | 12/2015 | Scott | F01D 9/065 |
| | | | | 60/796 |
| 2015/0354413 | A1 * | 12/2015 | Scott | F01D 25/24 |
| | | | | 415/200 |
| 2015/0361893 | A1 * | 12/2015 | Klingels | F01D 25/26 |
| | | | | 415/213.1 |
| 2015/0369067 | A1 * | 12/2015 | Pope | F01D 9/02 |
| | | | | 415/208.1 |
| 2016/0006226 | A1 * | 1/2016 | Moisei | F01D 17/02 |
| | | | | 174/72 R |
| 2016/0108758 | A1 | 4/2016 | Davis et al. | |
| 2016/0151829 | A1 | 6/2016 | Propheter-Hinckley et al. | |
| 2016/0151977 | A1 * | 6/2016 | Burd | G05B 19/4099 |
| | | | | 700/98 |
| 2016/0290164 | A1 | 10/2016 | Liebl et al. | |
| 2017/0030223 | A1 * | 2/2017 | Parry | F01D 25/243 |
| 2017/0096847 | A1 * | 4/2017 | Liu | B33Y 10/00 |
| 2017/0107823 | A1 * | 4/2017 | Roberts | F01D 5/147 |
| 2017/0167281 | A1 * | 6/2017 | Wilber | F01D 5/06 |
| 2017/0248030 | A1 * | 8/2017 | Marusko | F01D 11/08 |
| 2017/0314416 | A1 | 11/2017 | Sharma et al. | |
| 2017/0362960 | A1 * | 12/2017 | Treat | F01D 25/24 |
| 2018/0135517 | A1 * | 5/2018 | Mook | F02C 3/14 |
| 2018/0216493 | A1 * | 8/2018 | Moniz | F01D 25/16 |
| 2018/0216631 | A1 * | 8/2018 | Thornton | F04D 29/542 |
| 2018/0221958 | A1 * | 8/2018 | Torun | B22F 7/08 |
| 2019/0048798 | A1 * | 2/2019 | Slawinska | F02C 7/047 |
| 2019/0085698 | A1 * | 3/2019 | van der Merwe | F01D 1/26 |

OTHER PUBLICATIONS

Madara et al., Review of Recent Developments in 3-D Printing of Turbine Blades, European Journal of Advances in Engineering and Technology, vol. 4, Issue 7, Jan. 2017, pp. 497-509.

PCT International Search Report Corresponding to Application PCT/US2019/017238 dated Feb. 8, 2019.

* cited by examiner

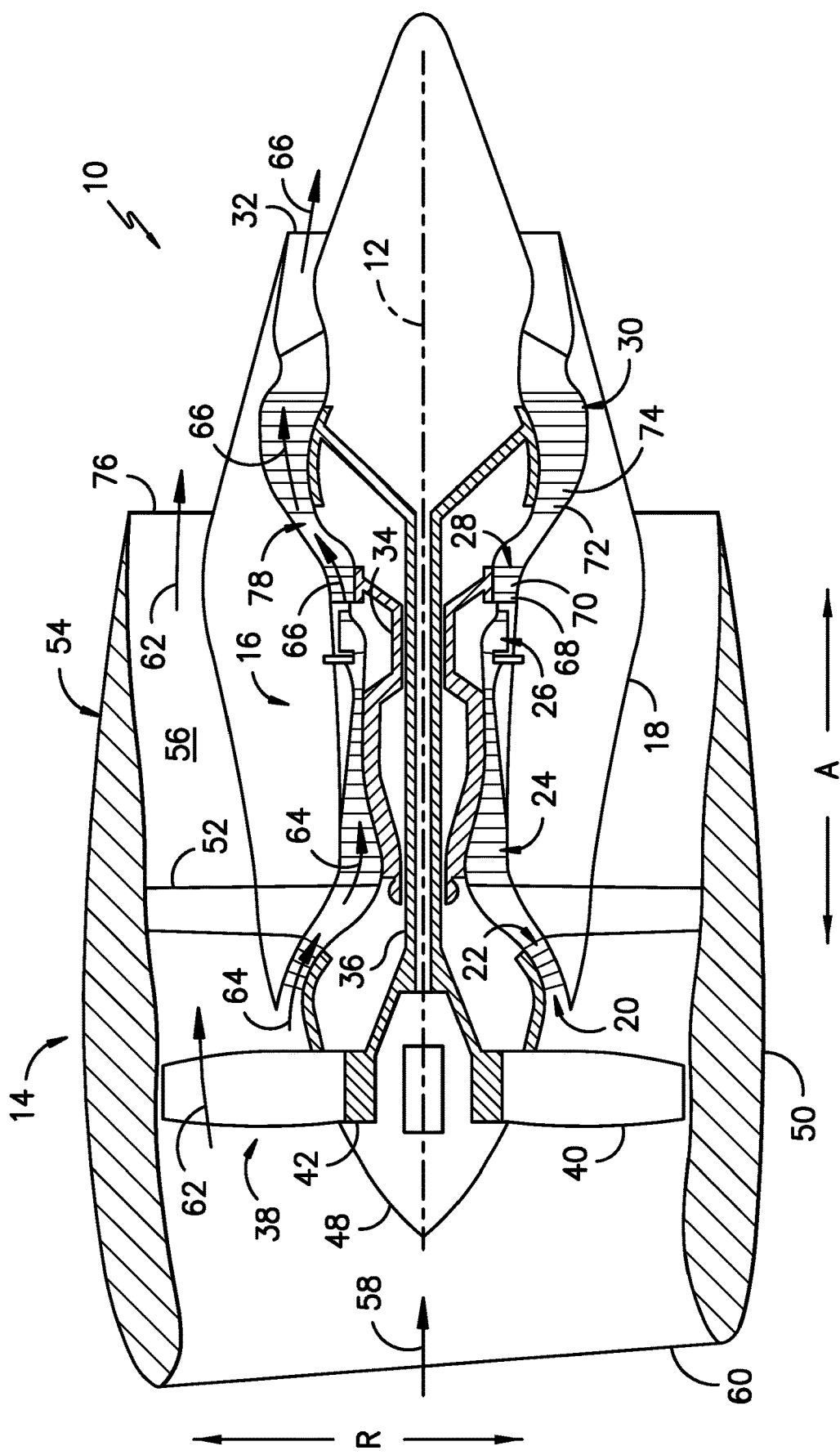

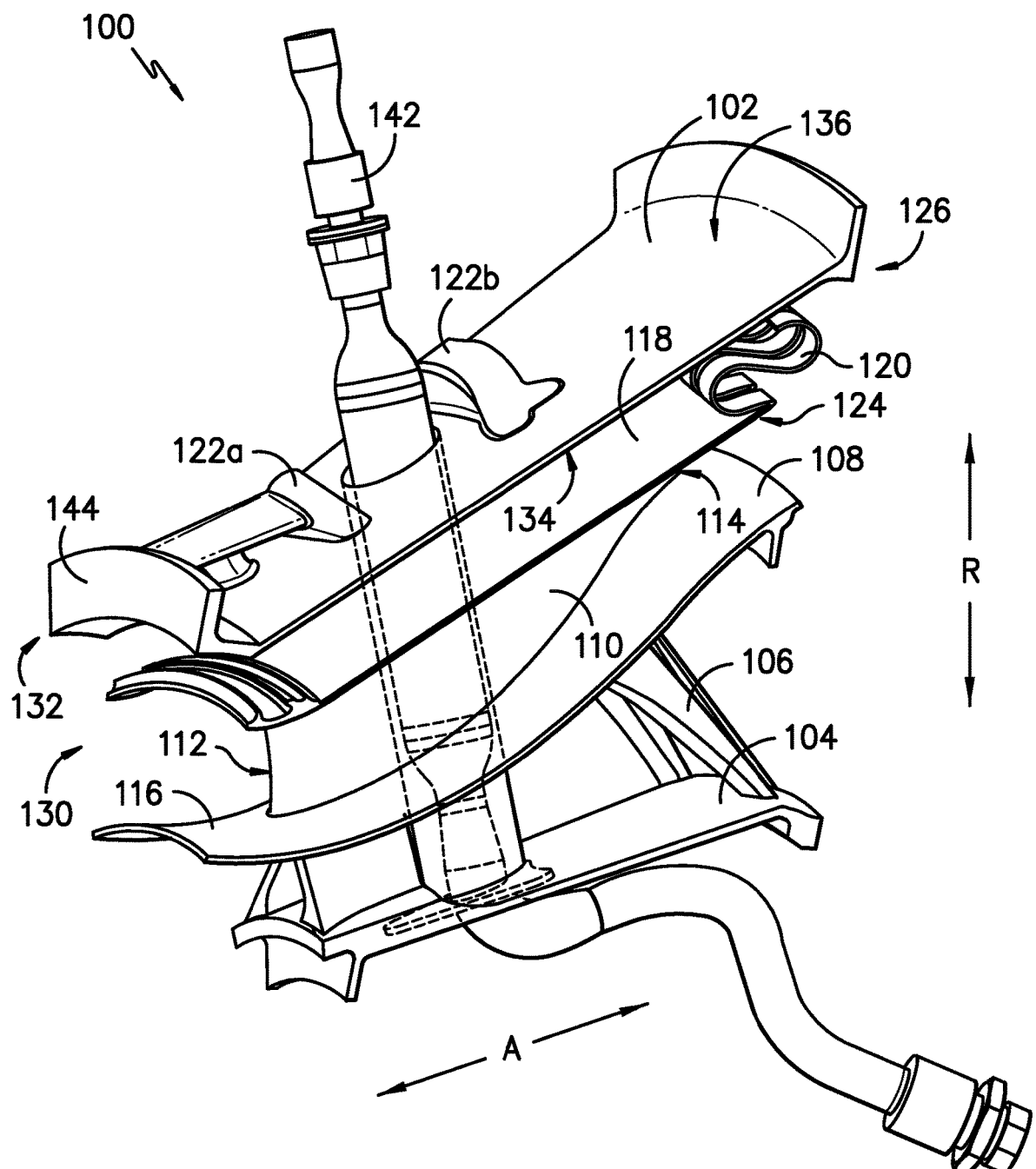
FIG. -2-

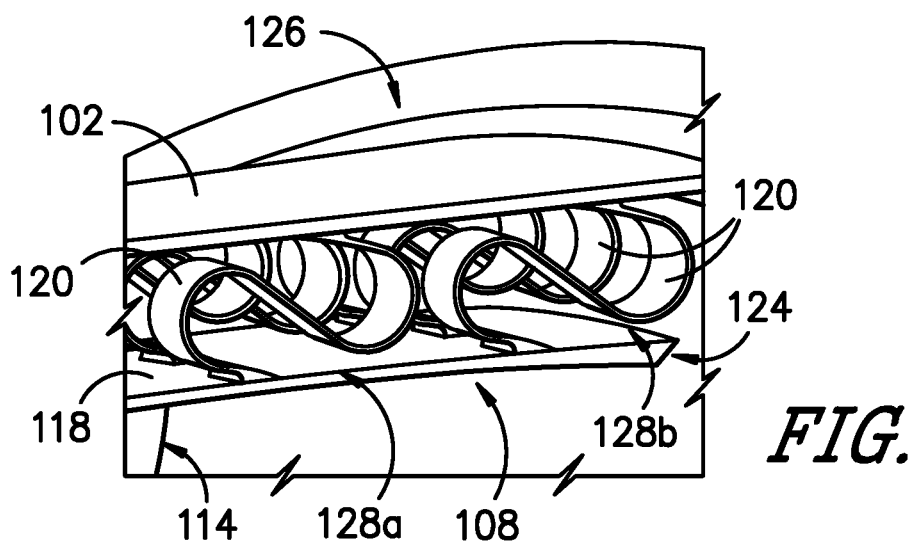
FIG. -3A-
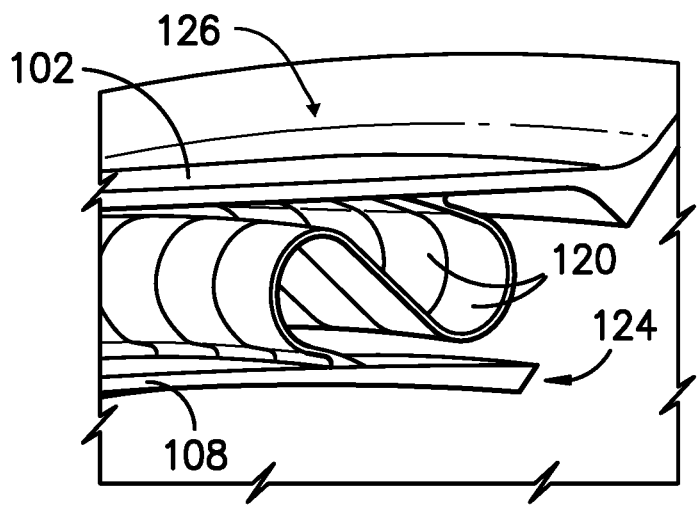
FIG. -3B-
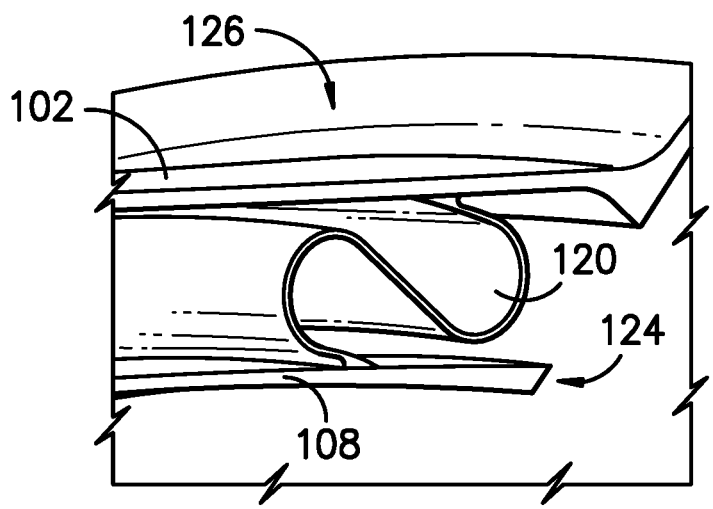
FIG. -3C-

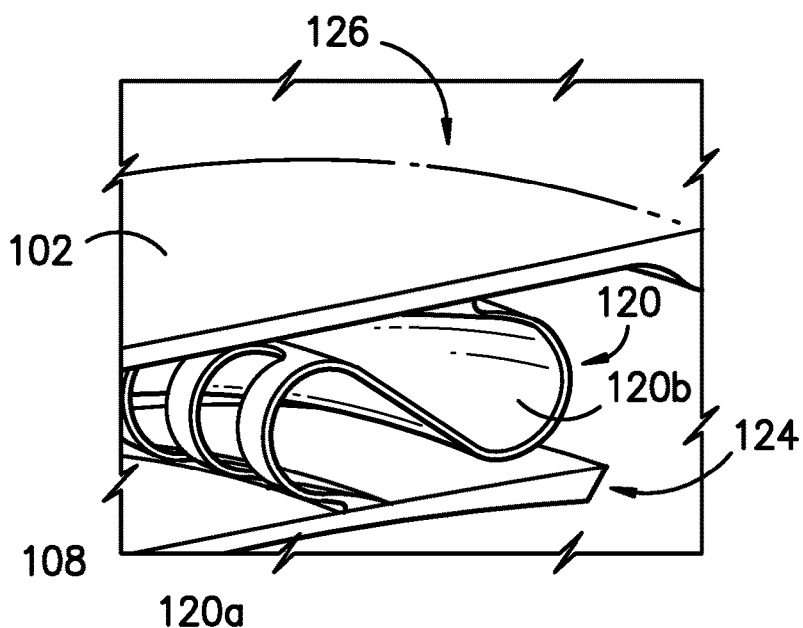
FIG. -3D-
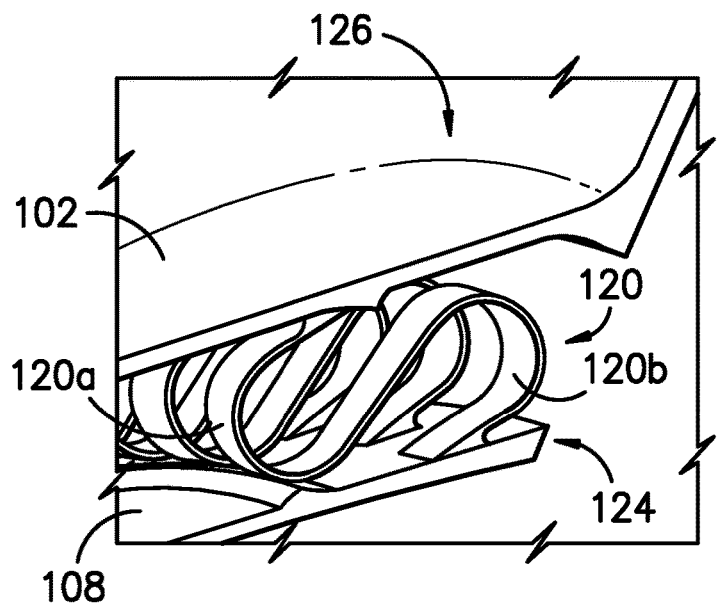
FIG. -3E-
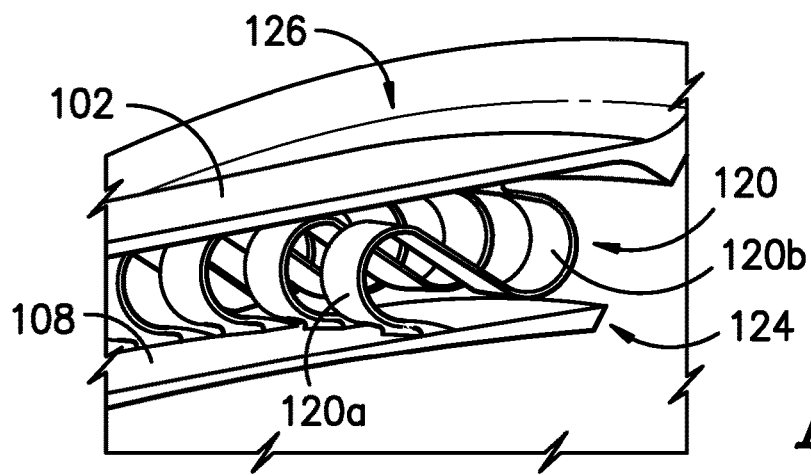
FIG. -3F-

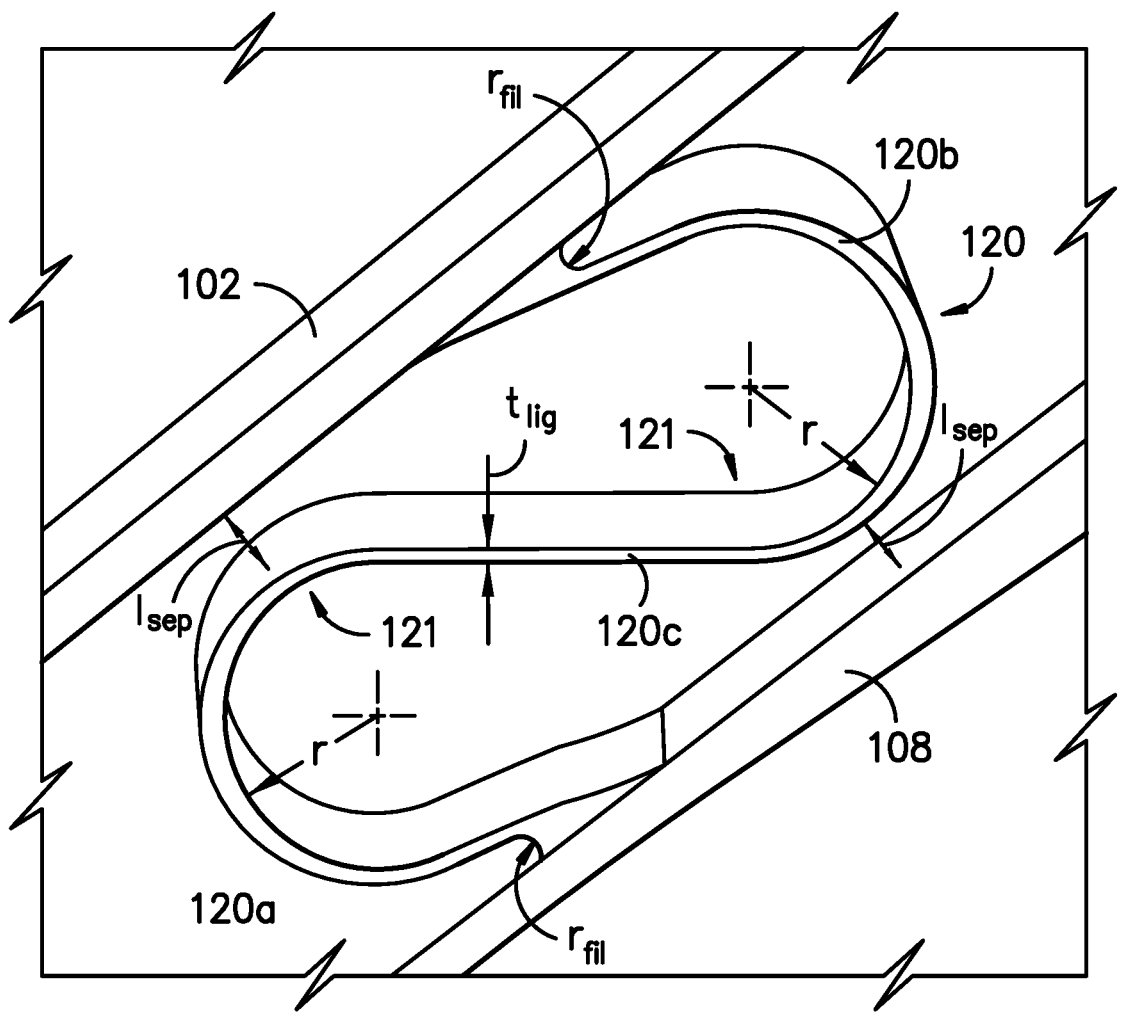
FIG. -3G-

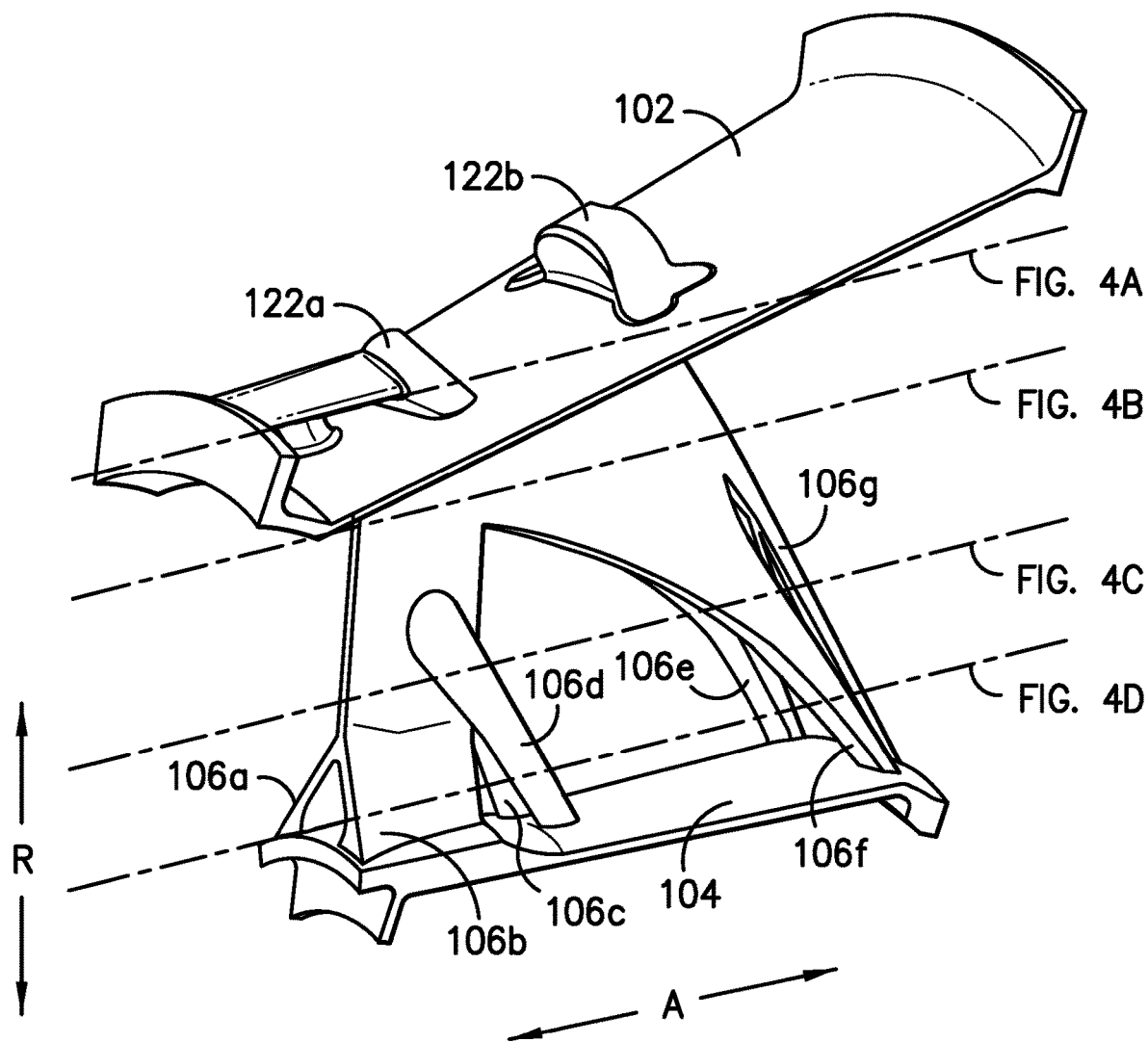
FIG. -4-

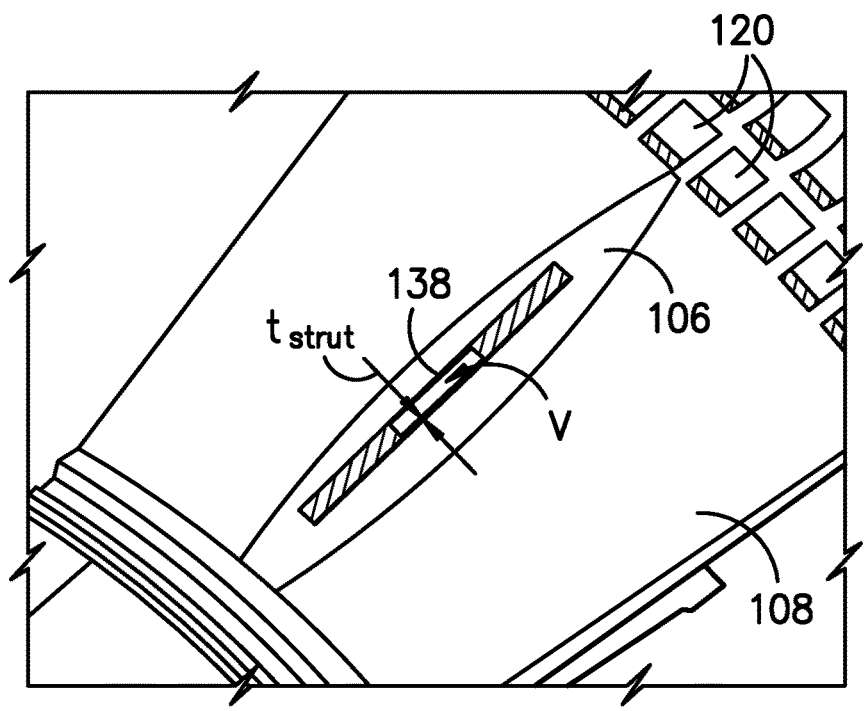
FIG. -4A-
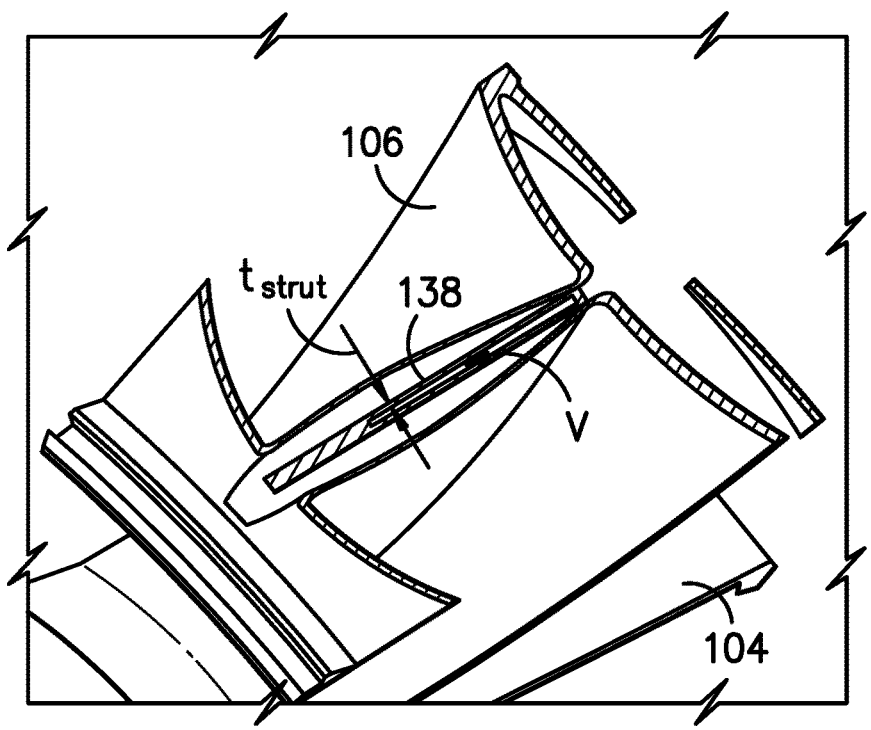
FIG. -4B-

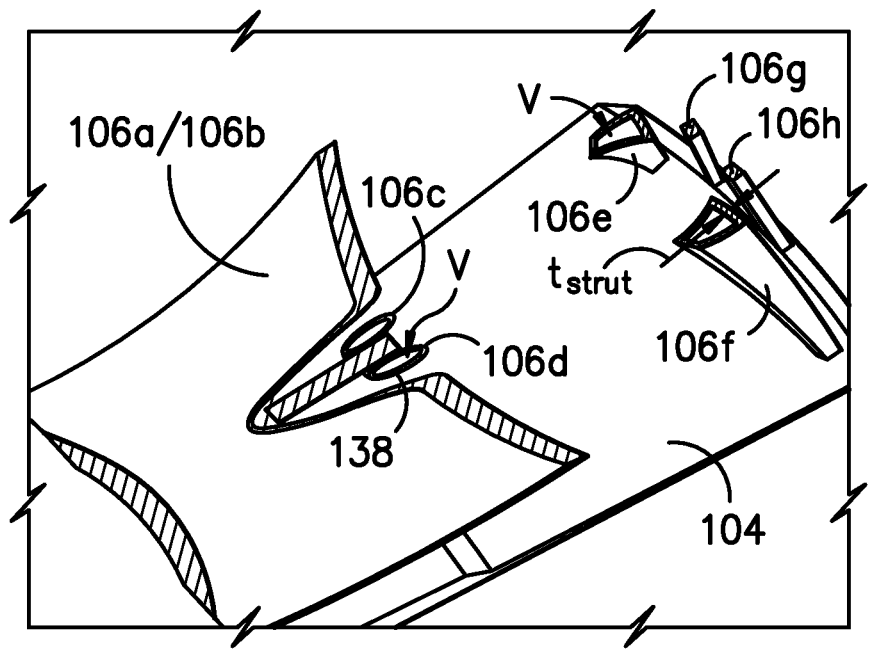
FIG. -4C-
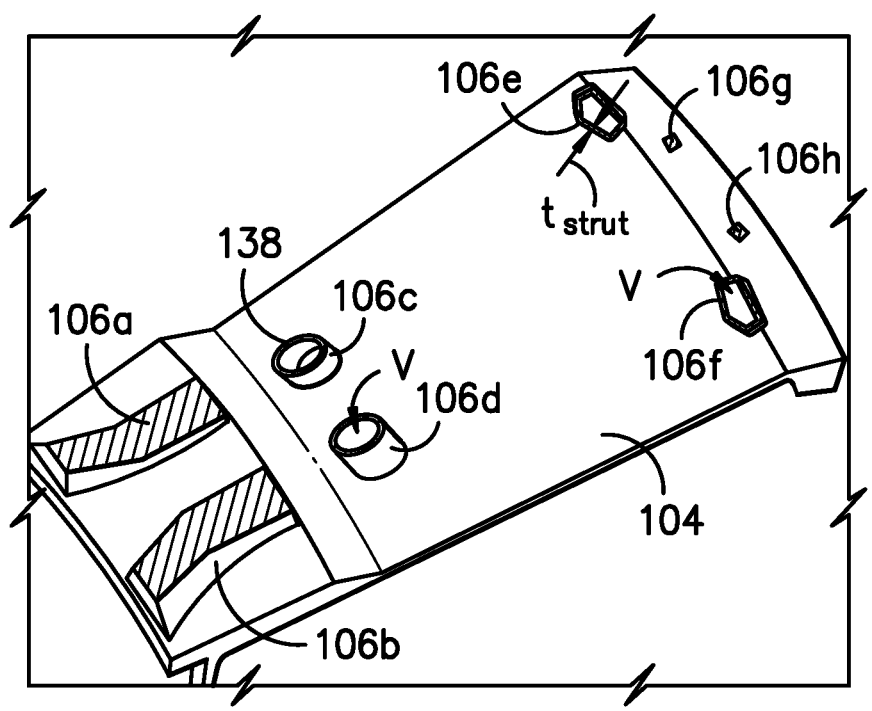
FIG. -4D-

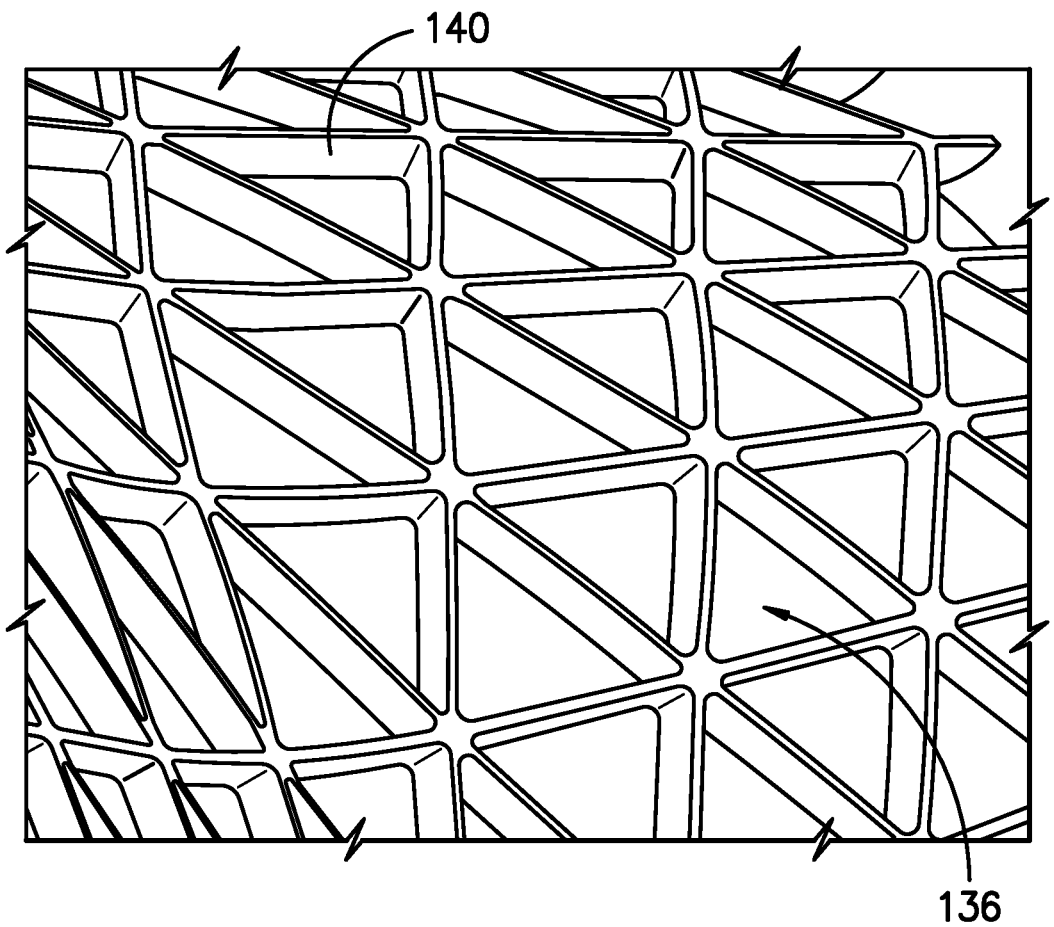
FIG. -5-

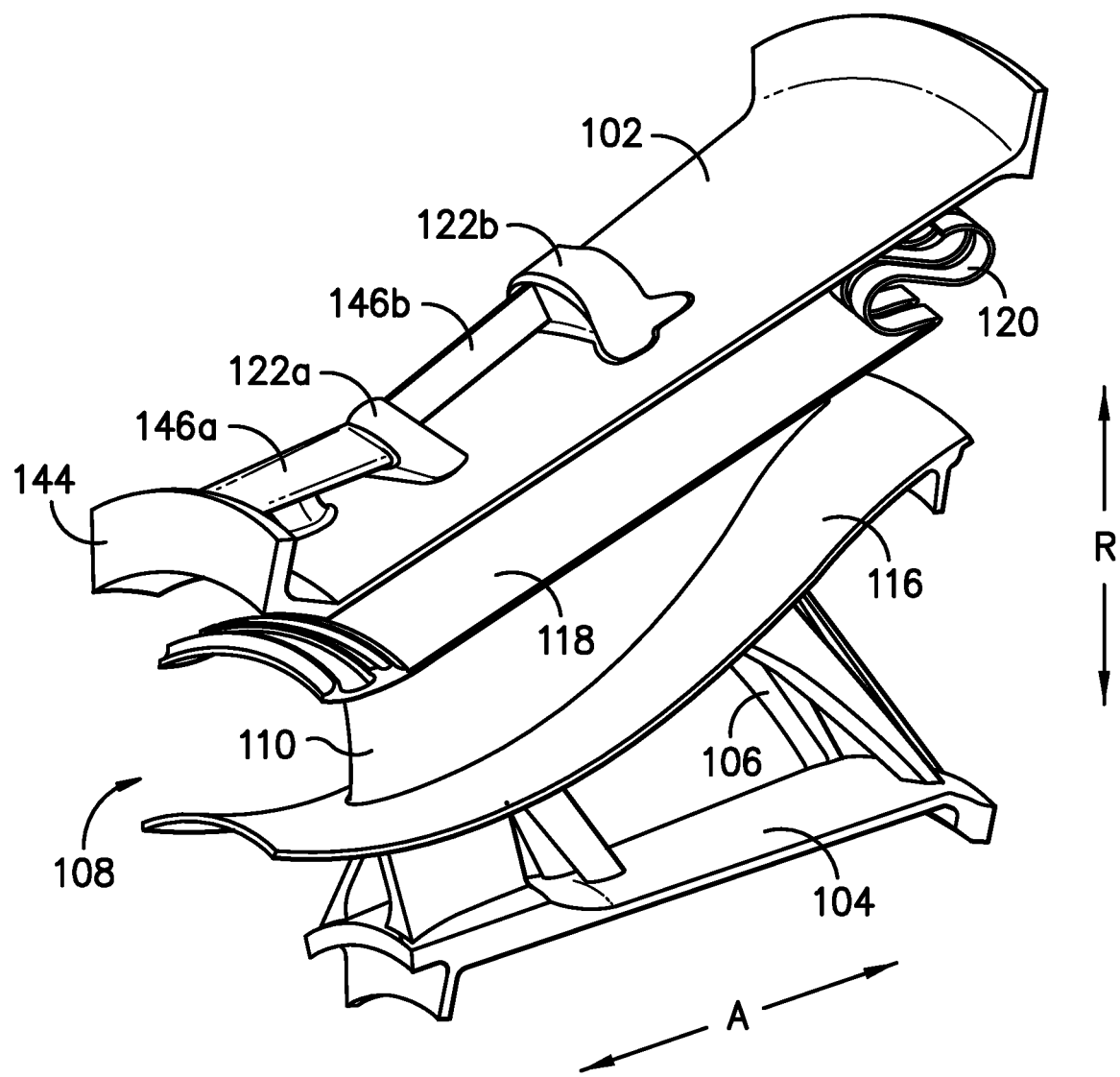
FIG. -6-

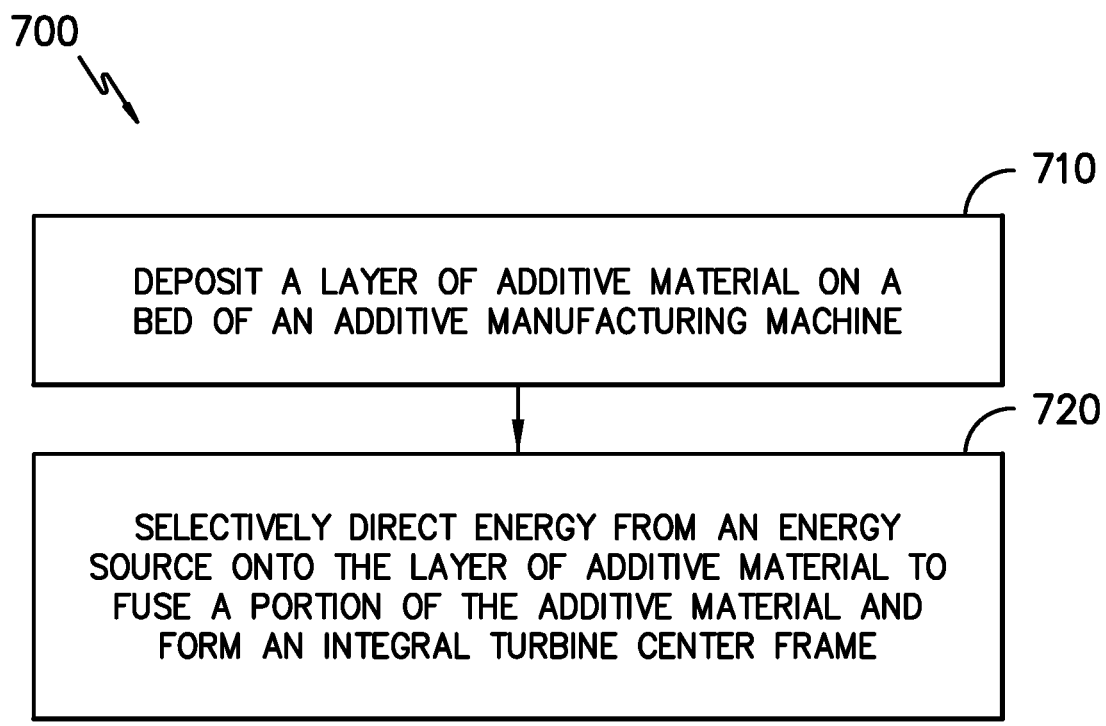
FIG. -7-

INTEGRAL TURBINE CENTER FRAME

FIELD

The present subject matter relates generally to gas turbine engines. More particularly, the present subject matter relates to turbine center frames for gas turbine engines.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

Typically, the turbine section includes a high pressure turbine and a low pressure turbine. A turbine center frame in part supports the high and low pressure turbines, as well as mechanically and structurally couples the high and low pressure turbines. Usually, the turbine center frame is formed from several hundred separate parts, which must be bolted, welded, and/or otherwise joined together to form the turbine center frame structure. As a result, the turbine center frame has a relatively high cost and lead time for manufacturing, assembly, and inventory. Further, using traditional manufacturing methods such as bolting or welding to join components of the turbine center frame presents a weight penalty, which affects the overall efficiency of the gas turbine engine. Moreover, several components of the turbine center frame require seals, e.g., to seal the combustion gas path, which can leak.

Accordingly, improved turbine center frame structures, such as an integral turbine center frame, would be desirable. For example, a single piece turbine center frame would be beneficial. More particularly, an integral turbine center frame formed by additive manufacturing would be useful.

BRIEF DESCRIPTION

Aspects and advantages of the invention will be set forth in part in the following description, or may be obvious from the description, or may be learned through practice of the invention.

In one exemplary embodiment of the present subject matter, a turbine center frame for a gas turbine engine is provided. The turbine center frame comprises an annular outer case and an annular hub. The hub is defined radially inward of the outer case such that the outer case circumferentially surrounds the hub. The turbine center frame further comprises an annular fairing extending between the outer case and the hub and a ligament extending from the fairing to the outer case to connect the fairing to the outer case. The turbine center frame also comprises a plurality of struts extending from the hub to the outer case and a boss structure defined on an outer surface of the outer case. The outer case, hub, fairing, ligament, plurality of struts, and boss structure are integrally formed as a single monolithic component.

In another exemplary embodiment of the present subject matter, an additively manufactured turbine center frame is provided. The additively manufactured turbine center frame comprises an annular outer case, an annular hub, and an annular fairing extending between the outer case and the hub. The hub is defined radially inward of the outer case such that the outer case circumferentially surrounds the hub. The fairing includes an inner wall and an outer wall, and a plurality of ligaments extends from the outer wall of the fairing to the outer case to connect the fairing to the outer case. The additively manufactured turbine center frame also comprises a plurality of struts extending from the hub to the outer case and a pair of bosses defined on an outer surface of the outer case.

In a further exemplary embodiment of the present subject matter, a method of manufacturing a turbine center frame is provided. The method comprises depositing a layer of additive material on a bed of an additive manufacturing machine and selectively directing energy from an energy source onto the layer of additive material to fuse a portion of the additive material and form the turbine center frame. The turbine center frame comprises an annular outer case and an annular hub. The hub is defined radially inward of the outer case such that the outer case circumferentially surrounds the hub. The turbine center frame further comprises an annular fairing extending between the outer case and the hub, a ligament extending from the fairing to the outer case to connect the fairing to the outer case, a plurality of struts extending from the hub to the outer case, and a boss structure defined on an outer surface of the outer case.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic cross-section view of an exemplary gas turbine engine including an acoustic liner, according to various embodiments of the present subject matter.

FIG. 2 provides a perspective view of a portion of an integral turbine center frame, according to an exemplary embodiment of the present subject matter.

FIGS. 3A through 3F provide perspective views of a portion of the integral turbine center frame of FIG. 2, illustrating various exemplary embodiments of a ligament structure.

FIG. 3G provides a schematic cross-section view of a ligament according to an exemplary embodiment of the present subject matter.

FIG. 4 provides a perspective view of the portion of the integral turbine center frame of FIG. 2, with a fairing and hardware removed.

FIGS. 4A through 4D provide cross-sectional views of the integral turbine center frame of FIG. 4.

FIG. 5 provides a perspective view of a portion of a non-flow path surface of the integral turbine center frame of FIG. 2, according to an exemplary embodiment of the present subject matter.

FIG. 6 provides a perspective view of the integral turbine center frame of FIG. 2 according to another exemplary embodiment of the present subject matter.

FIG. 7 provides a flow diagram of a method for forming an integral turbine center frame according to an exemplary embodiment of the present subject matter.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "forward" and "aft" refer to relative positions within an engine, with forward referring to a position closer to an ambient air inlet and aft referring to a position closer to an exhaust nozzle of the engine. The terms "upstream" and "downstream" refer to the relative direction with respect to fluid flow in a fluid pathway. For example, "upstream" refers to the direction from which the fluid flows, and "downstream" refers to the direction to which the fluid flows. Further, as used herein, terms of approximation, such as "approximately," "substantially," or "about," refer to being within a ten percent margin of error.

The present subject matter is generally directed to a turbine center frame and a method for additively manufacturing the turbine center frame. The turbine center frame described herein is an integral structure that includes an annular outer case and an annular hub defined radially inward of the outer case such that the outer case circumferentially surrounds the hub. An annular fairing extends between the outer case and the hub, and a ligament extends from the fairing to the outer case to connect the fairing to the outer case. Preferably, the ligament is a compliant or flexible member such that the connection between the fairing and outer case is flexible. The integral turbine center frame further includes a plurality of struts extending from the hub to the outer case and a boss structure defined on an outer surface of the outer case. By integrating the various portions of the turbine center frame into a single piece structure, the turbine center frame can be formed from a single material, such as a nickel-cobalt alloy or any other suitable material. Further, an integral turbine center frame comprises fewer parts than a typical turbine center frame, which may lower the weight of the gas turbine engine in which the turbine center frame is used, as well as reduce the manufacturing and inventory costs. Moreover, the additive manufacturing methods described herein allow the optimization of the various portions of the integral turbine center frame such that material can be eliminated, thereby decreasing the weight of the turbine engine in which the turbine center frame is installed, which can increase the performance of the engine. Further, integrating the various components of the turbine center frame helps reduce leakage from the turbine center frame. The lowered engine weight and reduced leakage may help improve specific fuel of the engine.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. In other embodiments of turbofan engine 10, additional spools may be provided such that engine 10 may be described as a multi-spool engine.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It will be appreciated that, although described with respect to turbofan 10 having core turbine engine 16, the present subject matter may be applicable to other types of turbomachinery. For example, the present subject matter may be suitable for use with or in turboprops, turboshafts, turbojets, industrial and marine gas turbine engines, and/or auxiliary power units.

Referring now to FIG. 2, an integral turbine center frame 100 ("integral TCF 100") is illustrated according to an exemplary embodiment of the present subject matter. The integral TCF 100 in part supports the HP turbine 28 and LP turbine 30, as well as mechanically and structurally couples the HP turbine 28 to the LP turbine 30. The integral TCF 100 includes an annular outer case 102 and an annular inner hub 104 that is defined radially inward of the outer case 102 such that the outer case circumferentially surrounds the hub 104. A plurality of struts 106 extends radially from the hub 104 to the outer case 102, thereby coupling together the hub 104 and case 102. A fairing 108 is disposed radially between the outer case 102 and the hub 104; the fairing 108 extends generally annularly about the hub 104 and protects the integral TCF 100 from a hot gas path environment. That is, the hot combustion gases 66 pass from the HP turbine 28 to the LP turbine 30 within the fairing 108 such that the outer case 102, hub 104, and other components of the integral TCF 100 are shielded from the hot gases 66 by the fairing 108. As described in greater detail below, each of the struts 106 passes radially through and is protected by a hollow fairing airfoil 110 of the fairing 108, and the fairing 108 includes a plurality of fairing airfoils 110. Each fairing airfoil 110 includes a leading edge 112 and a trailing edge 114 and extends radially between an inner wall 116 and an outer wall 118 of the fairing 108.

In general, the exemplary embodiments of the integral TCF 100 described herein may be manufactured or formed using any suitable process. However, in accordance with several aspects of the present subject matter, the integral TCF 100 may be formed using an additive-manufacturing process, such as a 3D printing process. The use of such a process may allow the integral TCF 100 to be formed integrally, as a single monolithic component, or as any suitable number of sub-components. In particular, the manufacturing process may allow the turbine center frame 100 to be integrally formed and include a variety of features not possible when using prior manufacturing methods. For example, the additive manufacturing methods described herein enable the manufacture of turbine center frames having any suitable size and shape with hollow truss-like struts, compliant ligaments joining the fairing 108 to the outer case 102, and other features which were not possible using prior manufacturing methods. Some of these novel features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For instance, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For instance, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

Moreover, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed that have different materials and material properties for meeting the demands of any particular application. Further, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example, a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For instance, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For instance, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer that corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For instance, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. For example, such components may include thin additively manufactured layers and unique fluid passageways with integral inlet and outlet manifolds. In addition, the additive manufacturing process enables the manufacture of a single component having different materials such that different portions of the component may exhibit different performance characteristics. The successive, additive nature of the manufacturing process enables the construction of these novel features. As a result, the components described herein may exhibit improved performance and reliability.

As described above in reference to FIG. 2, the turbofan engine 10 includes integral TCF 100 for supporting and coupling the HP turbine 28 and LP turbine 30. The integral TCF 100 includes an outer case 102, a hub 104, a fairing 108, at least one ligament 120, a plurality of struts 106, and a boss structure 122 that are integrally formed as a single monolithic component, e.g., by additive manufacturing as previously described. It should be understood that FIG. 2 illustrates only a portion of the integral TCF 100; the integral TCF 100 is generally annular in shape, extending circumferentially a full 360° about the axial centerline 12. The annular outer case 102 of the integral TCF 100 circumferentially surrounds the annular hub 104, which is defined radially inward of the outer case 102. An annular fairing 108 extends between the outer case 102 and the hub 104. The fairing 108 includes a radially inner wall 116 and a radially outer wall 118. Although only one fairing airfoil 110 is depicted in FIG. 2, it will be appreciated that a plurality of fairing airfoils 110 extends radially from the inner wall 116 to the outer wall 118, and the plurality of fairing airfoils 110 are circumferentially spaced apart from one another.

Referring to FIGS. 2 and 3A-3F, at least one ligament 120 extends from the fairing 108 to the outer case 102 to connect the fairing to the outer case. In the exemplary embodiment of FIG. 2, a plurality of ligaments 120 extends from an aft end 124 of the fairing outer wall 118 to an aft end 126 of the outer case 102. However, as shown in FIGS. 3A-3F, for example, the at least one ligament 120 may have one of several different configurations, and may connect to another portion of the integral TCF 100 at the same or a different location as the location shown in FIG. 2. For instance, the ligaments 120 could extend from a forward end 130 of the fairing 108 to a forward end 132 of the outer case 102, or the ligaments 120 could attach to an outer surface 136 of the outer case 102 rather than an inner surface 134, at the forward end 130, 132 or the aft end 124, 126.

Moreover, each illustrated ligament 120 has a generally S-shaped cross-section. In the embodiments depicted in FIGS. 3A, 3B, 3C, 3D, and 3F, a forward first arm 120a of each S-shaped ligament 120 extends from the fairing 108, more particularly, from the fairing outer wall 118, and an aft second arm 120b extends from the outer case 102. In the example of FIG. 3E, the forward first arm 120a extends from the outer case 102, and the aft second arm 120b extends from the fairing outer wall 118. The designation "forward" and "aft" with respect to the first arm 120a and the second arm 120b, respectively, is used to describe the axial position of each arm with respect to the other, i.e., the first arm 120a is axially forward of the second arm 120b, such that the first arm 120a is designated as the forward arm and the second arm 120b is designated as the aft arm. However, in other embodiments, the ligament(s) 120 may have other suitable cross-sections for forming a flexible connection between the fairing 108 and the outer case 102, as well as any suitable orientation within the integral TCF structure.

Further, one or more ligaments 120 may be provided between the fairing 108 and the outer case 102. For example, as illustrated in FIG. 3A, a plurality of ligaments 120, arranged in two rows 128 of ligaments 120, may connect the outer wall 118 of the fairing 108 to the outer case 102. The plurality of ligaments 120 in each of a first row 128a and a second row 128b are circumferentially spaced apart from one another, and the first row 128a is axially spaced apart from the second row 128b. Turning to FIG. 3B, in another embodiment, the plurality of ligaments 120 is arranged in a single circumferential row, and each ligament 120 is positioned close to or in contact with each circumferentially adjacent ligament 120. That is, little or no space may be defined between adjacent ligaments 120. In the embodiment of FIG. 3C, a single ligament 120 (rather than a plurality of ligaments 120) is provided. The single piece, annular ligament 120 extends circumferentially about the integral TCF 100 between the fairing 108 and the outer case 102, i.e., the ligament 120 is continuous over the entire 360° of the fairing 108 and outer case 102.

As shown in FIG. 3D, in other embodiments a portion of the single piece ligament 120 may be segmented, i.e., a portion of the ligament 120 may be generally solid or continuous while one or more voids or spaces are defined in another portion of the ligament 120. In the embodiment illustrated in FIG. 3D, the second arm 120b of the generally S-shaped ligament 120 extends circumferentially as an unbroken or continuous segment of the ligament, but the first arm 120a is segmented into a plurality of first arms 120a. In other embodiments, the second arm 120b may be segmented while the first arm 120a extends unbroken. In still other embodiments, both the first and second arms 120a, 120b may be segmented but the first arm 120a or second arm 120b may define more segments that the other arm. That is, a portion of the first arm 120a or second arm 120b may be unbroken over a circumferential length compared to the other arm but not unbroken over the entire circumferential length of the ligament 120.

Referring to FIGS. 3E and 3F, in other embodiments, a plurality of separate ligaments 120 may be provided. Each ligament 120 of the plurality of ligaments 120 is circumferentially spaced apart from the adjacent ligaments 120 such that the plurality of ligaments 120 is disposed circumferentially about the axial centerline 12. As described above, in the embodiment of FIG. 3E, the forward first arm 120a of each generally S-shaped ligament 120 extends from the outer case 102, and the aft second arm 120b of each generally S-shaped ligament 120 extends from the fairing 108. The opposite configuration is used in the embodiment of FIG. 3F, i.e., the forward first arm 120a of each generally S-shaped ligament 120 extends from the fairing 108, and the aft second arm 120b of each generally S-shaped ligament 120 extends from the outer case 102.

Each ligament 120 shown in the exemplary embodiments is a compliant, flexible member such that a flexible connection is provided between the fairing 108 and the outer case 102. The shape and flexibility of each ligament 120 allows, for example, the thermally loaded portion of the integral TCF 100, i.e., the fairing 108, to expand and contract without developing high stresses within the integral TCF 100. A compliant or flexible ligament 120 may be formed in several ways. For instance, the generally S-shaped cross-section of the exemplary ligaments 120 helps form a flexible connection between the fairing 108 and outer case 102. Further, referring to FIG. 3G, each ligament 120 may have a thickness $t_{lig}$ and a length $l_{lig}$; the length $l_{lig}$ is measured from where the ligament 120 connects to the fairing 108 to where the ligament 120 connects to the outer case 102. The thickness $t_{lig}$ may vary along the length $l_{lig}$ of the ligament 120 in order to achieve a desired flexibility of the ligament 120. For example, the thickness $t_{lig}$ of each of the first arm 120a and the second arm 120b may be within a range of about 40 mils to about 70 mils, and the thickness $t_{lig}$ of an intermediate portion 120c, which connects the first arm 120a and second arm 120b, may be within a range of about 20 mils to about 40 mils. More particularly, the thickness $t_{lig}$ of each of the first and second arms 120a, 120b may be within a range of about 50 mils to about 60 mils, and the thickness $t_{lig}$ of the intermediate portion 120c may be within a range of about 25 mils to about 35 mils. Moreover, a radius of curvature r of each arm 120a, 120b of each generally S-shaped ligament 120 may vary to vary the flexibility of the ligaments 120. Similarly, a fillet radius $r_{fil}$ between each ligament 120 and the fairing 108 and the fillet radius $r_{fil}$ between each ligament 120 and the outer case 102 may vary to vary the flexibility of the ligaments 120. Likewise, a separation length $l_{sep}$ between each arm 120a, 120b and the fairing 108 or outer case 102, whichever is the adjacent TCF portion, may vary to vary the flexibility of the ligaments 120. In the depicted embodiment, the separation length $l_{sep}$ is measured generally from a transition zone 121, where the respective first arm 120a or second arm 120b transitions to or from the intermediate portion 120c, to the outer case 102 or the fairing 108, whichever is most closely adjacent to the respective transition zone 121. Of course, different shaped ligaments 120, e.g., a ligament or ligaments 120 having a different cross-sectional shape, may be used to achieve a desired flexibility in the connection between the fairing 108 and the outer case 102.

As will be understood from the foregoing, the ligament or ligaments 120 extending from the fairing 108 to the outer case 102 may have a variety of configurations, as well as several positions with respect to the fairing 108 and outer case 102. The configuration of the ligament or ligaments 120 connecting the fairing 108 with the outer case 102 may be selected based on, e.g., the loading conditions of the particular gas turbine engine in which the integral TCF 100 is to be used. For example, the ligament(s) 120 for a particular engine may have an optimum shape, thickness, flexibility, position, etc. based on the loading conditions of the engine.

Referring now to FIGS. 4, 4A, 4B, 4C, and 4D, an exemplary embodiment of the plurality of struts 106 of the integral TCF 100 will be described in greater detail. As shown in FIGS. 2 and 4, each strut 106 of the plurality of struts 106 extends from the hub 104 to the outer case 102, thereby providing stiffness and structural integrity to the integral TCF 100. Further, as indicated in FIG. 2, at least a portion of the plurality of struts 106 are hollow, which allows hardware, air flow, or the like to pass through the struts 106, such as the illustrated hardware 142. More particularly, as shown in FIGS. 4A-4D, each of the plurality of struts 106 is defined by a strut wall 138. The strut wall 138 of at least a portion of the struts 106 defines a volume V such that each strut 106 in such portion of the struts 106 is internally hollow. Further, as illustrated in FIGS. 4A-4D, the strut wall 138 has a thickness $t_{strut}$, and the thickness $t_{strut}$ of the strut wall 138 of at least a portion of the struts 106 varies radially such that the strut wall thickness $t_{strut}$ is non-uniform along the radial direction R. For example, the strut wall thickness $t_{strut}$ in FIG. 4A, depicting a cross-section of the strut wall 138 at a first radial position within the integral TCF 100, is greater than the strut wall thickness $t_{strut}$ in FIG. 4B, depicting a cross-section of the strut wall 138 at a second radial position within the integral TCF 100.

Moreover, as illustrated in FIG. 2, at least one strut 106 of the portion of the internally hollow struts 106 extends within one of the plurality of fairing airfoils 110 such that the at least one hollow strut 106 extends from the hub 104 to the outer case 102 through the fairing airfoil 110. Accordingly, hardware, air flow, or the like may pass through the interior of the fairing airfoil 110 within the hollow strut 106. Additionally, the struts 106 generally are truss-like, forming a frame that provides stiffness to the integral TCF 100, e.g., to meet the stiffness requirement of the turbine center frame.

For instance, each strut 106 may comprise a plurality of branches, such as branches 106a, 106b, 106c, 106d, 106e, 106f, and 106g illustrated in FIG. 4, that form a frame from the hub 104 to the outer case 102. Such a truss-like configuration of struts 106 can provide adequate support and stiffness to the integral TCF 100 while lowering the weight of the TCF relative to other designs, such as known designs that utilize box-like struts, e.g., by eliminating material between the branches of each strut 106. Further, as shown in FIG. 5, a stiffening design or pattern of material 140 may be provided on any non-flow path surface of the integral TCF 100 to increase the stiffness of the turbine center frame. For example, the stiffening pattern of material 140 may be provided on an outer surface 136 of the outer case 102 to help increase the stiffness of the integral TCF 100.

Referring now to FIGS. 2 and 6, a boss structure 122 is defined on the outer surface 136 of the outer case 102. In the depicted embodiments, the boss structure 122 comprises a pair of bosses, a first boss 122a and a second boss 122b. The bosses 122a, 122b are axially spaced apart from one another such that one boss, e.g., the first boss 122a, is defined closer to the forward end 132 of the outer case 102 and the other boss, e.g., the second boss 122b, is defined closer to the aft end 126 of the outer case 102. As shown in FIG. 2, in some embodiments, the forward boss (first boss 122a in the depicted embodiment) is connected to a forward flange 144 of the outer case 102 by a first connecting member 146a that extends axially from the forward flange 144 to the first boss 122a. In other embodiments, as illustrated in FIG. 6, the bosses 122a, 122b of the boss structure 122 are connected to one another by a second connecting member 146b that extends axially from the first boss 122a to the second boss 122b. It will be appreciated that the boss structure 122 may have any suitable configuration and position on the outer case 102 to help the integral TCF 100 meet buckling and stiffness requirements while minimizing the weight of the integral TCF 100. Further, a boss structure 122 may be defined on the outer case 102 radially outward from each strut 106, e.g., to provide stability to the region where the strut 106 attaches to the outer case 102.

It should be appreciated that the integral TCF 100 is described herein only for the purpose of explaining aspects of the present subject matter. For example, the integral TCF 100 will be used herein to describe exemplary configurations, constructions, and methods of manufacturing the integral TCF 100. It should be appreciated that the additive manufacturing techniques discussed herein may be used to manufacture other center frames or similar components for use in any suitable device, for any suitable purpose, and in any suitable industry. Thus, the exemplary components and methods described herein are used only to illustrate exemplary aspects of the present subject matter and are not intended to limit the scope of the present disclosure in any manner.

Now that the construction and configuration of the integral TCF 100 according to an exemplary embodiment of the present subject matter has been presented, an exemplary method 700 for forming an integral turbine center frame according to an exemplary embodiment of the present subject matter is provided. Method 700 can be used by a manufacturer to form the integral TCF 100, or any other suitable turbine center frame. It should be appreciated that the exemplary method 700 is discussed herein only to describe exemplary aspects of the present subject matter and is not intended to be limiting.

Referring now to FIG. 7, method 700 includes, at step 710, depositing a layer of additive material on a bed of an additive manufacturing machine. Method 700 further includes, at step 720, selectively directing energy from an energy source onto the layer of additive material to fuse a portion of the additive material and form a turbine center frame. For example, using the example from above, the integral TCF 100 may be formed for supporting and coupling the HP turbine 28 and the LP turbine 30.

The additively manufactured turbine center frame may include an annular outer case 102, an annular hub 104 that is defined radially inward of the outer case 102 such that the outer case 102 circumferentially surrounds the hub 104, an annular fairing 108 that extends between the outer case 102 and the hub 104, at least one ligament 120 extending from the fairing 108 to the outer case 102 to connect the fairing 108 to the outer case 102, a plurality of struts 106 extending from the hub 104 to the outer case 102, and a boss structure 122 defined on an outer surface 136 of the outer case 102. In exemplary embodiments of the additively manufactured turbine center frame, at least a portion of the plurality of struts 106 are hollow, and the at least one ligament 120 is a flexible member such that a flexible connection is provided between the fairing 108 and the outer case 102. Notably, according to an exemplary embodiment, the outer case 102, hub 104, fairing 108, ligament 120, plurality of struts 106, and boss structure 122 are integrally formed as a single monolithic component.

FIG. 7 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 700 are explained using the integral TCF 100 as an example, it should be appreciated that these methods may be applied to manufacture any suitable turbine center frame or similar component.

An integral turbine center frame and a method for manufacturing an integral turbine center frame are described above. Notably, the integral TCF 100 generally may include geometries and configurations whose practical implementations are facilitated by an additive manufacturing process, as described herein. For example, using the additive manufacturing methods described herein, the integral turbine center frame may include a plurality of ligaments extending from a fairing to an outer case of the integral TCF 100 to provide a flexible connection between the fairing and outer case. As another example, a plurality of struts may be disposed about the integral TCF 100 to support and provide stiffness to the structure, and at least a portion of the struts may be hollow to allow other components of the gas turbine engine and/or fluid flows to pass through the turbine center frame. In addition, the additive manufacturing techniques described herein enable the integration of the hollow struts with the fairing such that the hollow struts pass through the fairing airfoils to provide a truss-like support for the integral TCF 100. The additive manufacturing methods described herein also may help facilitate the variable ligament thickness $t_{lig}$ and strut wall thickness $t_{strut}$. The foregoing features, as well as the other features described herein, may be introduced during the design of the turbine center frame, such that they may be easily integrated into the turbine center frame during the build process at little or no additional cost. Moreover, the entire turbine center frame, including the outer case, hub, fairing, ligament(s), plurality of struts, boss structure, and all other features can be formed integrally as a single monolithic component.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A turbine center frame for a gas turbine engine, comprising:
    an annular outer case;
    an annular hub, the hub defined radially inward of the outer case such that the outer case circumferentially surrounds the hub;
    an annular fairing extending between the outer case and the hub;
    a ligament extending from the fairing to the outer case to connect the fairing to the outer case;
    a plurality of struts extending from the hub to the outer case, each strut extending through the fairing, each strut comprising a plurality of branches extending therefrom along a radial direction; and
    a boss structure defined on an outer surface of the outer case,
    wherein the outer case, hub, fairing, ligament, plurality of struts, and boss structure are integrally formed as a single monolithic component.

2. The turbine center frame of claim 1, wherein at least a portion of the plurality of struts are hollow.

3. The turbine center frame of claim 2, wherein each of the plurality of struts is defined by a strut wall having a thickness, the thickness of the strut wall of at least a portion of the struts varying radially such that the strut wall thickness is non-uniform along a radial direction.

4. The turbine center frame of claim 1, wherein the turbine center frame comprises a plurality of ligaments extending from the fairing to the outer case, and wherein each ligament is a flexible member such that a flexible connection is provided between the fairing and the outer case.

5. The turbine center frame of claim 1, wherein the outer case includes a forward flange, and wherein the boss structure is connected to the forward flange.

6. The turbine center frame of claim 1, wherein the boss structure comprises a pair of bosses, and wherein the pair of bosses are connected to one another.

7. The turbine center frame of claim 1, wherein a plurality of fairing airfoils extends from an inner wall to an outer wall of the fairing, the plurality of fairing airfoils circumferentially spaced apart from one another, the plurality of fairing airfoils connecting the inner wall to the outer wall.

8. The turbine center frame of claim 1, wherein at least one branch of the plurality of branches is hollow.

9. The turbine center frame of claim 1, wherein the ligament is a single piece, annular structure that extends circumferentially about the turbine center frame.

10. An additively manufactured turbine center frame, comprising:
    an annular outer case;
    an annular hub, the hub defined radially inward of the outer case such that the outer case circumferentially surrounds the hub;

an annular fairing extending between the outer case and the hub, the fairing including an inner wall and an outer wall;

a plurality of ligaments extending from an aft end of the outer wall of the fairing to an aft end of the outer case to connect the fairing to the outer case;

a plurality of struts extending from the hub to the outer case, each strut extending through the fairing; and a pair of bosses defined on an outer surface of the outer case, wherein the outer case, hub, fairing, plurality of ligaments, plurality of struts, and pair of bosses are integrally formed as a single monolithic component.

11. The additively manufactured turbine center frame of claim 10, wherein the bosses are axially spaced apart from one another such that one boss of the pair of bosses is defined closer to a forward end of the outer case and the other boss of the pair of bosses is defined closer to an aft end of the outer case.

12. The additively manufactured turbine center frame of claim 10, wherein each ligament has a generally S-shaped cross-section and is a flexible member such that a flexible connection is provided between the fairing and the outer case.

13. The additively manufactured turbine center frame of claim 10, wherein each of the plurality of struts is defined by a strut wall, and wherein the strut wall of a portion of the struts defines a volume such that the portion of the struts are internally hollow.

14. The additively manufactured turbine center frame of claim 13, wherein a plurality of fairing airfoils extends from the inner wall to the outer wall of the fairing, the plurality of fairing airfoils circumferentially spaced apart from one another, and wherein at least one strut of the portion of the struts that are internally hollow extends within one of the plurality of fairing airfoils such that the at least one strut extends from the hub to the outer case through the one of the plurality of fairing airfoils.

15. The additively manufactured turbine center frame of claim 10, wherein each of the plurality of struts is defined by a strut wall having a thickness, the thickness of the strut wall of at least a portion of the struts varying radially such that the strut wall thickness is non-uniform along a radial direction, and wherein the strut wall thickness is greater at a first location than a second location, the first location radially closer to the outer case than the second location.

16. The additively manufactured turbine center frame of claim 10, wherein the plurality of ligaments is arranged in a first circumferential row and a second circumferential row, the ligaments in the first circumferential row positioned circumferentially side-by-side such that each ligament in the first circumferential row is circumferentially spaced apart from a respective adjacent ligament and the ligaments in the second circumferential row positioned circumferentially side-by-side such that each ligament in the second circumferential row is circumferentially spaced apart from a respective adjacent ligament, and wherein the second circumferential row is positioned aft of the first circumferential row.

17. A method of manufacturing a turbine center frame, the method comprising:

depositing a layer of additive material on a bed of an additive manufacturing machine; and selectively directing energy from an energy source onto the layer of additive material to fuse a portion of the additive material and form the turbine center frame, the turbine center frame comprising:

an annular outer case;

an annular hub, the hub defined radially inward of the outer case such that the outer case circumferentially surrounds the hub;

an annular fairing extending between the outer case and the hub;

a ligament extending from an aft end of the fairing to an aft end of the outer case to connect the fairing to the outer case;

a plurality of struts extending from the hub to the outer case, each strut extending through the fairing; and a boss structure defined on an outer surface of the outer case, wherein the outer case, hub, fairing, ligament, plurality of struts, and boss structure are integrally formed as a single monolithic component.

18. The method of claim 17, wherein at least a portion of the plurality of struts are hollow.

19. The method of claim 17, wherein the ligament is a flexible member such that a flexible connection is provided between the fairing and the outer case, wherein the ligament has a generally S-shaped cross-section comprising a first arm and a second arm, wherein the first arm is axially forward of the second arm and extends from the aft end of the outer case and the second arm extends from the aft end of the fairing.

* * * * *